United States Patent [19]

Oswald et al.

[11] 3,765,998
[45] Oct. 16, 1973

[54] SHAPABLE FIBER-REINFORCED LOW MOLECULAR WEIGHT POLYETHYLENE TEREPHTHALATE

[75] Inventors: Hendrikus J. Oswald; Dusan C. Prevorsek, both of Morristown; Paul J. Koch, Mount Freedom; Leon Segal, Morristown, all of N.J.

[73] Assignee: Allied Chemical Corporation, New York, N.Y.

[22] Filed: Jan. 11, 1971

[21] Appl. No.: 105,450

[52] U.S. Cl............... 161/170, 156/242, 156/244, 161/93, 161/156, 161/194, 264/136, 264/324
[51] Int. Cl............................................. B32b 5/16
[58] Field of Search............. 161/170, 194, DIG. 4, 161/93, 156; 156/244, 332, 181, 242; 260/75 M, 41 AG; 117/140, 126 GQ, 126 GR; 264/134–137, 257, 258, 324

[56] References Cited
UNITED STATES PATENTS

| 3,390,132 | 6/1968 | Walker | 161/194 X |
| 3,621,092 | 11/1971 | Hofer | 264/324 X |
| 2,892,747 | 6/1959 | Dye | 161/231 X |
| 3,274,136 | 9/1966 | Glesner et al | 260/23.5 |
| 3,578,547 | 5/1971 | Wicker | 161/170 X |

Primary Examiner—William A. Powell
Attorney—Arthur J. Plantamura and Herbert G. Burkard

[57] ABSTRACT

Glass fiber-reinforced thermoplastic polymer composite sheets are formed using semicrystalline polymers that have their glass transition temperature above room temperature and may be cold formed, i.e., shaped in a cold mold when preheated outside the mold. Glass-reinforced low molecular weight polyethylene terephthalate, or blends thereof, may be shaped in a cold mold, and exhibit excellent performance.

3 Claims, 2 Drawing Figures

Patented Oct. 16, 1973
3,765,998
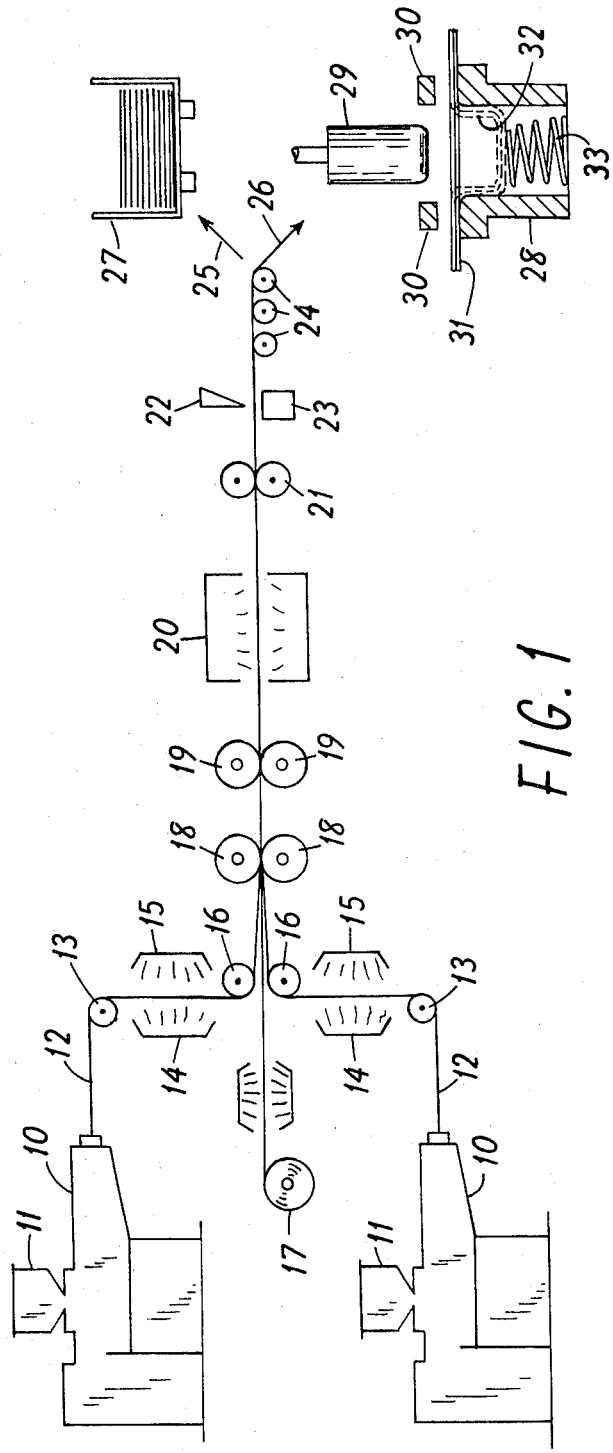
FIG.1
FIG.2
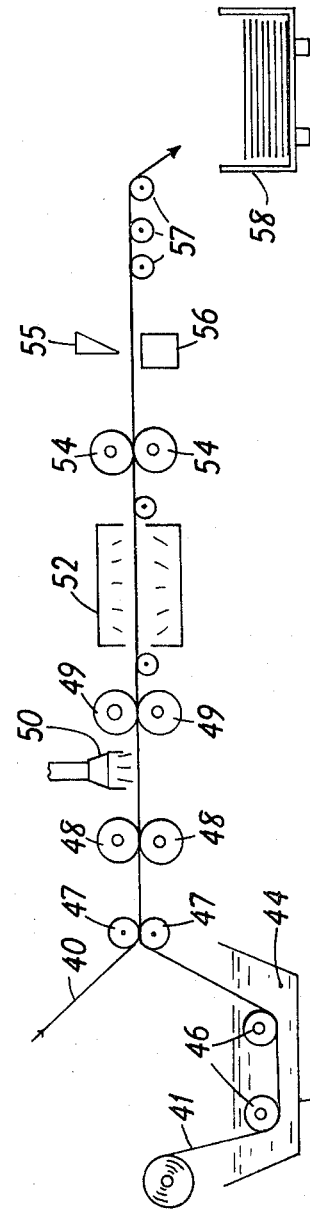
INVENTORS
HENDRIKUS J. OSWALD
DUSAN C. PREVORSEK
PAUL J. KOCH
LEON SEGAL
BY Arthur J. Plantamura
ATTORNEY

SHAPABLE FIBER-REINFORCED LOW MOLECULAR WEIGHT POLYETHYLENE TEREPHTHALATE

BACKGROUND OF THE INVENTION

This invention relates to shaped thermoplastic articles. More particularly, this invention relates to a composite sheet consisting of thermosplastic low molecular weight polymers of polyethylene terephthalate reinforced with glass fibers where the said sheet can be shaped into items of desired geometry in a shaping apparatus operating at essentially ambient temperature when said sheet is preheated to a temperature above the softening point of the polymer.

It is known that many thermoplastic polymers can be formed at ambient temperature by means of various sheet metal-forming techniques such as deep drawing, stretch forming, stamping, etc. These cold sheet-forming processes are economically very attractive because it is possible to achieve rapid production rates, e.g., rates that exceed one item a second or even faster. Unfortunately, the products prepared by prior art due to the limitations imposed by starting materials which can be shaped by such rapid forming means, exhibit deficiencies in their properties, namely, low heat distortion temperature, poor dimensional stability under load, tendency towards stress cracking, low modulus and strength, etc. Consequently, the potential for a broad range of end-use applications heretofore has been severely limited.

Many attempts have been made to overcome these problems by altering the process or the construction of the sheets without affecting essentially the rate of production (or the residence time in the mold). For example, it is known that one can improve the heat distortion temperature, impart resistance, and over-all performance of the shaped item in a process where preheated glass-reinforced thermoplastic sheets are shaped in a cold mold. This technique has not heretofore been considered applicable except to such amorphous polymers as polyvinyl chloride and styrene-acrylonitrile copolymer and solely to crystalline polymers having a very high molecular weight, i.e., high melt viscosity, such as polypropylene.

All these polymers, which have been employed in rapid forming operations, exhibit a unique high melt viscosity at their softening point and will not flow under their own weight. For example, when external pressure is applied, the specific values of the melt viscosity at the softening points of several commercial-grade polymers are as follows:

Polyvinyl chloride $10^{13}$ poise at 87°C and $3 \times 10^5$ poise at 150°C;

Styrene acrylonitrile copolymer $10^{13}$ poise at 100°C and $2 \times 10^5$ poise at 200°C;

Polypropylene $2 \times 10^6$ poise at 175°C and $7 \times 10^5$ poise at 200°C. It is this unique high melt viscosity of polymers employed by cold mold forming in the prior art that allows one to preheat the reinforced polymer sheets which have been employed heretofore without losing sheet coherency before placing them in the forming press where they are shaped in a cold mold.

SUMMARY OF THE INVENTION

We have now discovered a method which allows the use of high melting, low molecular weight, semicrystalline polymers of the linear polyester type, which have a glass transition temperature over 25°C and excellent high temperature properties, in the cold mold stamping operation. Standard commercial plastic or fiber-grade polyester polymers have a rather low molecular weight and very low viscosity or high fluidity at a temperature slightly higher (i.e., about 10°C) than their melting or softening point. For example, the viscosity of fiber-grade polyethylene terephthalate (PET) is approximately $4 \times 10^3$ poise at 280°C. With viscosities of this magnitude, the polyester resin would simply drip away from the aforementioned glass reinforcement and the reinforced sheet would sag and lose all its coherency during the external preheating stage before it could be inserted in the press for stamping the same in a cold mold into a shaped article. The invention employs viscosities which are even lower, e.g., 100 to 400 poises. We have now found that the coherency of the preheated sheet comprising resins of these very low viscosities can be retained by using a fibrous mat made from long fibers forming a structurally well defined coherent fibrous phase or layer, e.g., a nonwoven mat, woven cloth, intertwined fibers or agglomerated fibers held together by adhesive resinous binders or mechanically bound by stitching. This contrasts with short, chopped fibers, e.g., about one-half inch or shorter, which do not afford the necessary coherent structural strength. By use of such fibrous mat, the polyester resin when heated over its softening point is retained, by surface tension, between interstices of the nonwoven mat, and by capillary action between the fibers comprising the glass strands. Relatively very low molecular weights of PET may be used—molecular weights which heretofore have not been considered feasible to form usable objects by an standard thermoplastic processing method. These extremely low molecular weights result in decreased melt viscosities, for example, $2 \times 10^2$ poise at 280°C and 70 poise at 300°C, which allow highly effective polymer-fiber interaction. In addition, the low molecular weight of the PET leads to both higher crystallization rates and higher levels of ultimate crystallinity, which are desirable characteristics, because early development of crystallinity results in a greater initial stiffness which reduces the necessary residence time in the shaping press.

While these desirable features of low molecular weight PET are to be expected, such polymers have not been employed previously to form fibers, films, or moldings because of the inherent shortcomings of such polyers such as extremely high melt fluidity and extreme brittleness of the solidified polymer. It is the specific aim of this invention to utilize such polymers in combination with the coherent fibrous reinforcement described above to form a composite material which exhibits all of the desirable features of the low molecular weight resins, but in which the undesirable features are taken advantage of in order to achieve physical properties heretofore unobtainable with such materials. The exploitation of the material deficiencies, as well as the material advantages, is possible because of the nature of the forming process, which is an integral part of the invention.

The formable sheet of the invention may be modified by incorporating a suitable filler such as asbestos in the resin to increase the viscosity or lower the fluidity when heated above the softening point of the resin. In this case, it is not absolutely necessary to use a bonded nonwoven mat, and loose glass fibers can be used, if the volume per cent of asbestos in the resin is increased sufficiently to increase the viscosity to an appropriate level.

Additionally, the long fiber-reinforced PET of the invention may be bonded to other plastic sheet or layer which, for example, may consist of unfilled or inorganic mineral filled PET sheet, or of polymers other than PET may be adhesively bonded to the fiber-filled substrate.

The low molecular weight, fiber-filled polyester matrix sheet of this invention is found to exhibit excellent properties such as greater impact and flexural strengths. These sheets are also characterized by substantially higher heat distortion temperature than known reinforced thermoplastic sheets.

It is an object of the invention to provide a novel glass-filled composite sheet of high melting semicrystalline polymers that may be shaped in a cold mold.

It is another and more specific object of the invention to provide novel composite sheets of semicrystalline polymers of PET and mixtures thereof which are reinforced with glass fiber and/or asbestos, or other mineral filler, which have high melting temperatures and which may be shaped using a relatively rapid cycle in a cold mold.

It is another object of this invention to provide a method or technique which allows the glass fiber-reinforced sheet to be preheated and handled without adverse effect on the resin and so that the sheet is rapidly formable by stamping in a press using a cold mold.

These and other objects of the invention will become apparent from the accompanying description and examples.

BRIEF DESCRIPTION OF THE DRAWING

FIGS. 1 and 2 depict means which may be employed in preparing and utilizing in a continuous manner the thermoplastic sheets of the invention.

DESCRIPTION OF THE PREFERRED EMBODIMENTS

In accordance with the invention, exceptionally good shaped products may be obtained from composite glass fiber-filled thermoplastic sheets prepared from semicrystalline PET. In particular, items produced from glass-reinforced and glass asbestos-reinforced PET show excellent performance at elevated temperatures and exceptional dimensional stability (low moisture absorption).

The semicrystalline PET polymers that may be employed are generally a nonmolding grade having a weight average molecular weight of from about 5,000 to 45,000 as determined by dilute solution viscosity measurements and having a level of crystallinity of from about 20 percent to about 60 percent as determined by X-ray techniques.

The term polyester as used in this invention is intended to include polyesters and copolyesters which contain less than 30 percent of a modifying constituent, whether it be a second acid, a second diol, or both. The preferred polyesters for purposes of this invention are those obtained from ethylene glycol and terephthalic acid. The copolyester may contain more than three combined copolymerizable constituents if desired and may involve other linkages such as amide and ether linkages.

Any of the dibasic acids or their derivatives which are capable of forming polyesters with glycols may be utilized as constituents of the polyester. Suitable dibasic acids include terephthalic, isophthalic, naphthalene dicarboxylic (1.5; 2.6; and 2.7), hexahydroterephthalic, bibenzoic, substituted terephthalic, oxalic, malonic, succinic, adipic, suberic, sebacic, etc.

Suitable glycols include in addition to those having a general formula $HO(CH_2)_nOH$ where $n = 2$ to 10 neopenthyl glycol, cyclohexane dimethanol, etc., also diphenols such as bisphenols, naphthalene diphenols (1.4; 1.5; 2.6; 2.7), and the like.

The PET used in the process of the invention may have a weight average molecular weight of from about 5,000 to about 45,000, preferably 10,000–35,000. Such a low molecular weight polymer may be obtained by either limited polymerization of the above-mentioned glycols and dibasic acids, or by any one of several degradative operations performed upon higher molecular weight polymers or by neutral or acid catalyzed hydrolysis of higher molecular weight PET.

Normally, any degradation, i.e., lowering of molecular wegiht, which may occur during normal PET film- or fiber-forming operations is considered highly detrimental to the finished product. In PET, as with other polymers in general, it is usually expected that a number of mechanical properties, including flexural life, tensile strength, and tensile elongation, and impact strength, decrease as the molecular weight of the polymer decreases. With PET in particular, the lowering of the molecular weight below about 45,000 has heretofore resulted in polymers which were not formable into useful objects because of their extreme brittleness (low impact strength) and high fluidity (difficulty in processing). However, in accordance with the present invention, molecular weight PET well below 30,000 in combination with the reinforcing fiber phase as described herein, is used to produce molded or shaped articles of extremely high impact strength. Furthermore, it is the extremely low viscosity of such polymers which allows thorough impregnation of the glass-fiber strands by the molten polymer, and which results in the improved properties of the composite produced by the method of this invention. The resultant product does not contain, to any noticeable degree, the large number of entrapped microvoids which are usually inherent in the fabrication of composites produced by the impregnation of fibrous reinforcements by viscous, high molecular weight resins.

Another advantage of using low molecular weight polymer in combination with the long fiber reinforcement is that the rapid initiation period for crystallite growth, and the high degree of attained crystallinity, results in a product with a number of desirable properties such as excellent solvent resistance at elevated temperatures, improved stiffness, and excellent impact resistance at all temperatures. Improved properties of this kind are not derived with similar materials reinforced with short fibers, or with noncrystalline long fiber-reinforced resin composites. As has been noted, the low viscosity of such low molecular weight PET does not allow fabrication into shaped articles by the process of this invention unless it is employed in combination with stabilized long glass-fiber reinforcement.

The term glass fibers, as used herein, is intended to be employed in a broad sense to include glass cloth as well as individual, continuous fibers, more particularly known as filaments, which have a length greater than 1 inch and preferably between about 1.25 in. and about 3.0 in.; groups of twisted strands, more particularly known as yarn or thread; untwisted or slightly twisted groups of strands; generally looped back on one another, more particularly known as roving; discontinuous lengths of fibers, more particularly known as staple fibers which can be spun into threads twisted strands, sliver, roving or yarn.

In addition, mechanically bound discontinuous nonwoven glass roving, yarn, or strands may be employed. The method of mechanical binding may be by "needling," i.e., stitching with glass or by depositing the long glass fibers in such a manner as to form an entangled, stable mat.

The relative proportions of the compositions comprising sheets of polyethylene terephthalate as the matrix and filler, i.e., glass fiber or graphite fibers, or combinations thereof, or glass fiber and graphite fiber in combination with asbestos or other mineral filler such as talc, alumina, calcium carbonate, mica, titanium oxide, quartz, carbon clays, glass particles or beads, and the like, or organic filler, e.g., high molecular weight polyethylene in fine particle size, may vary from about 10 percent to 75 percent for the fibrous area, preferably 25 percent to 65 percent, based on the weight of the total composition. Up to about 40 percent by weight of said fillers or of a high melting condensation polymer may be blended into the PET matrix of the invention, e.g., nylon and many polyesters other than PET.

Various processing techniques may be employed in the preparation of the reinforced composite sheets of the present invention. The plastic sheet may be formed by casting a mixture of fluid polymer and glass fiber onto a flat surface until the composition has set so that it is self-sustaining and may be handled as a sheet material. Plastic sheets may be extruded separately and then placed into a number of alternating plastic sheet-glass mat layers, which are thoroughly fused under heat and pressure.

Molding or shaping of the sheet is accomplished in a manner such as that conventionally used in plastic forming under heat and pressure, i.e., by stamping or otherwise forming in a mold or other shaping apparatus, at a temperature of about the softening point or higher. Retention in the mold, which is comparatively cold, is limited to relatively short duration, e.g., 1-30 seconds, or until substantial crystallinity results and the shape cools sufficiently to allow its shape to be self-sustaining.

The following examples illustrate further this invention.

EXAMPLE 1

Glass-reinforced PET sheet is prepared using a subsequently degraded fiber-grade polymer having a weight average molecular weight of 60,000-70,000 as follows. Ground and dried polymer is dispersed into layers of nonwoven glass mats constructed from discontinuous chopped fibers of 2-in. minimum length. Seven layers of glass mat are used to produce an one-eighth-in. thick composite sheet whose weight ratio of polymer to glass is about 60:40. The polymer is distributed between the layers as uniformly as possible. Fusion of the sandwich assembly is carried out in a compression mold in a dry nitrogen atmosphere at 285°C. The final step of fusion is carried out at 100 psi for 5 min. The sheets are cooled slowly in the press under pressure to develop crystallinity.

Shaping is accomplished in a deep-drawing press which had a triple-action die-set to produce 5-in. dia. cylindrical cups. The glass-reinforced sheet was preheated to 240°C. for 6 min. in an atmosphere of relative humidity equal to 50 percent. Exposure of the polymer to this amount of moisture at this elevated temperature resulted in controlled hydrolytic degradation of the polymer down to a weight average molecular weight of approximately 25,000, as can be determined by methods described below. Such a low molecular weight polymer has heretofore not been utilized to form usable fibers, films or molded objects.

The preheated sheet was stamped in a conventional manner with the die at room temperature (23°C) with the exception that the dwell time was 10 sec. to allow the shaped part to crystallize in the mold and to cool below 150°C before removing from the press. The stamping pressure was 100 psi. Physical properties were determined upon the part thus obtained by cutting test specimens from the shaped cup. The properties obtained are shown in Table I. All mechanical properties were obtained under standard ASTM test conditions.

The molecular weight of the PET in the polymer-glass composite after hydrolytic degradation can be determined by a modification of the standard solution viscosity measurements. A sample of the polymer-glass composite is placed in a furnace at 600°–700°C for 6 hours, after which time the polymer is completely vaporized. The exact amount of glass in the composite is thus determined by weighing the residue. Another sample of polymer-glass composite is simultaneously dissolved in an appropriate solvent such as o-chlorophenol. The polymer solution is separated from the galss by simple filtration and, since the glass content of the composite is now known, the amount of polymer in solution is also known. The molecular weight is determined by any one of several solution viscosity measurements as is known to any chemist skilled in the art. For example, with a solvent system such as tetrachloro-ethane/phenol (1:1 mix at 30°C), the Mark-Houwink equation relating intrinsic viscosity of PET to molecular weight is $$[\eta] = 2.29 \times 10^{-4} M_w 0.73$$

EXAMPLE 2

Glass-reinforced PET sheet was prepared in the same manner as shown in Example 1. Shaping of the glass-reinforced PET was accomplished in the same manner as shown in Example 1, except that the stamping pressure was 500 psi. Mechanical properties for samples taken from objects shaped in this manner are presented in Table I.

Comparing the shaping conditions of Example 1 and Example 2 it is seen that the only difference is the stamping pressure, which is five times higher than in Example 1. The physical properties of the specimens of Example 2 are all considerably higher than those of Example 1. It can be concluded that the higher stamping pressure resulted in more intimate contact between the polymer and glass reinforcement and in a decrease in the volume and/or number of voids which are inherent in all polymer-glass systems. This decrease in detrimental voids and more intimate contact result in the improved properties of the specimen of Example 2. Determination of the void content or impregnation efficiency can be made by any of several microphotography techniques.

EXAMPLE 3

Glass-reinforced PET sheet was prepared in the same manner as shown in Example 1, except that the weight average molecular weight of the starting polymer was 20,000. PET of such low molecular weight, as noted hereinabove, is not normally considered feasible to form molded objects. Shaping was accomplished by preheating the composite sheet at 280°C for 6 min. in a dry nitrogen atmosphere. The absence of moisture thus precluded further degradation of the polymer and the molecular weight was maintained at an essentially constant level. Further forming of the composite sheet was accomplished in a manner identical to that of Example 1, and the results are presented in Table I.

As compared to Example 1, it is seen that the molecular weight of the PET polymer has been decreased by 20 percent and the preheat temperature has been increased to just above the crystalline melting point of the PET. The 20 percent decrease in molecular weight decreases the melt viscosity by approximately 50 percent, as can be determined by the standard and well known relation between viscosity and molecular weight for high polymers, i.e., $$\eta_{melt} = KM_W^{3.4}$$

Also, the severe decrease in melt viscosity at temperatures just exceeding the crystalline melting point of PET lowers the melt viscosity to 100–400 poise, which is one five-hundreth to one one-thousandth the viscosity of high molecular weight polymers of styrene-acrylonitrile or polypropylene at comparable temperatures. This extremely low melt viscosity allows intimate contact between the polymer and the fibrous reinforcement and thereby results in extremely good mechanical properties even at low stamping pressures. As can be seen from Table I, the mechanical properties of the specimens of Example 3 are even better than those of Example 2, although the stamping pressure is only 100 psi compared to the 500 psi stamping pressure of Example 2.

It can be assumed from the previous examples that by increasing the stamping pressure to 500 psi while keeping all of the variables of Example 3 constant should lead to the best mechanical properties.

EXAMPLE 4

The composite sheet preparation procedure and shaping procedure of Example 3 was repeated, except that the stamping pressure was increased to 500 psi. The results are presented in Table I. It is seen that, in general, the best mechanical properties are obtained for specimens of Example 4. Photomicroscopic inspection of specimens prepared as in Example 4 shows almost a complete absence of microvoids.

EXAMPLE 5 (Comparative)

The effect of the long-glass-fiber reinforcement upon the mechanical properties of reinforced PET was examined by blending the PET with one-eighth-in. long glass fibers in an extruder. The weight average molecular weight of the resultant composite was determined by the procedure outlined above as 25,000. The PET-glass fiber mixture was compression molded as in Example 1 into sheets one-eighth-in. thick. Attempts to shape these sheets in the stamping press, as outlined in Example 1, were unsuccessful since the composite sheet reinforced with short glass fibers did not possess any integral stability, and actually disintegrated during the preheat procedure. Transfer of the heated sheet to the shaping press was therefore not possible.

It was, therefore, necessary to injection mold the PET-short glass-fiber composite into test specimens. The results are presented in Table I, where it is seen that relatively poor mechanical properties are obtained from this short glass fiber-reinforced PET of low molecular weight.

EXAMPLE 6 (Comparative)

PET was reinforced with one-eighth-in. long glass fibers as in Example 5, except that the molecular weight of the polymer was maintained at 80,000. PET of this approximate molecular weight is normally employed to form fibers, films or other shaped objects. Although the molecular weight and the viscosity of this sample are higher than of Example 5, the strength of the preheated sheet is not adequate to prevent disintegration during the preheat. Specimens were therefore injection molded for mechanical testing, and the results are presented in Table I.

Comparing Example 5 to Example 6, it is observed that the mechanical properties of the short glass fiber-reinforced composite improves as the molecular weight increases, which is the expected observation. However, the composite is still wholly inadequate with respect to properties needed to shape it in a cold mold. The long fibrous reinforcement, the means of support and stability for the composites of the present invention, serves to increase the strength levels of objects shaped in a manner heretofore unknown in the art. In particular, the improved impact strength of the long fiber-reinforced material should be noted as being nearly tenfold greater than that of the short fiber-reinforced, injection molded, material of a fourfold higher molecular weight.

TABLE I.—PROPERTIES OF PET-GLASS COMPOSITE SHEETS

| | Example | | | | | |
|---|---|---|---|---|---|---|
| | 1 | 2 | 3 | 4 | 5 | 6 |
| Preheat temp. (° C.) | 240 | 240 | 240 | 280 | | |
| Stamping pressure (p.s.i.) | 100 | 500 | 100 | 500 | | |
| Molecular weight | 25,000 | 25,000 | 20,000 | 20,000 | 25,000 | 80,000 |
| Glass content (weight percent) | 40 | 40 | 40 | 40 | 30 | 30 |
| Tensile strength (p.s.i.) | 16,000 | 19,900 | 20,400 | 24,100 | 13,000 | 19,000 |
| Tensile modulus (p.s.i.×10⁻⁶) | 1.30 | 1.6 | 1.5 | 1.6 | 1.2 | 1.55 |
| Tensile elongation (percent) | 2.0 | 2.1 | 2.0 | 2.2 | 1.0 | 1.5 |
| Flexural strength (p.s.i.) | 15,000 | 28,000 | 34,900 | 35,500 | 15,000 | 27,000 |
| Flexural modulus (p.s.i.×10⁻⁶) | 1.03 | 1.30 | 1.27 | 1.48 | 1.1 | 1.4×10⁶ |
| Compressive strength (p.s.i.) | 19,700 | 23,500 | 26,000 | 26,000 | 19,000 | 23,000 |
| Impact strength (ft.-lb./in. notch) | 15 | 15 | 15 | 15 | 1.0 | 1.8 |

EXAMPLE 7

Asbestos-reinforced polyester was prepared by blending asbestos with PET in an extruder. The asbestos-polyester composite was ground and dried, and a composite sheet was prepared in the same manner as shown in Example 1, except that the composition by weight of the composite sheet was 60% PET, 25% 2-in. long (minimum) glass fibers, 15 percent asbestos by weight.

Shaping of the glass-reinforced PET was accomplished in the same manner as shown in Example 1. Properties of the composite sheet are presented in Table II.

TABLE II

PROPERTIES OF PET/GLASS/ASBESTOS COMPOSITES

| | |
|---|---|
| Preheat Temperature (°C) | 260 |
| Stamping Pressure (psi) | 500 |
| Molecular Weight | 25,000 |
| Composition (Wt. %) | 25% glass/15% asbestos |
| Tensile Strength (psi) | 11,100 |
| Tensile Modulus (psi × $10^{-6}$) | 0.95 |
| Tensile Elongation (%) | 2.0 |
| Flexural Strength (psi) | 13,400 |
| Flexural Modulus (psi × $10^{-6}$) | 0.76 |
| Compressive Strength (psi) | 21,400 |
| Impact Strength (ft.-lb./in.notch) | 13.5 |

EXAMPLE 8

Asbestos-reinforced polyester was prepared by blending 40 g. of asbestos with 60 g. of PET in an extruder. The asbestos-polyester composite was ground and dried, and fused into sheets 0.030 inch thick by compression molding in a dry nitrogen atmosphere. A glass-reinforced PET sheet was prepared as shown in Example 1, except that the total composite thickness was 0.065 inch thick. A sandwich construction of these sheets was prepared by placing sheets of asbestos-PET on either side of the glass-PET center sheet. The total thickness of this 3-ply laminate was therefore 0.125 inch, and the total filler content of this laminate was 40 percent by weight of composite. This 3-ply laminate was shaped by the method described in Example 1. Fusion between the two face sheets and the center sheet occurred during the preheat and shaping operations. Properties comparable to those of Examples 2 through 4 were obtained.

It should be noted that thermoplastics other than asbestos-filled PET can be used for the face sheets if desired.

EXAMPLE 9

Continuous preparation and utilization of the high-impact thermoplastic sheet is shown by using a single glass fiber mat (FIG. 1). Glass reinforcement other than the mat may be utilized. A pair of extruders 10, into which the thermoplastic resin or asbestos, plus thermoplastic resin, is fed at 11, extrudes a sheet 12 over support rollers 13, and are fed to a pair of guide rollers 16. The temperature is suitably maintained by means of infrared heaters 14 and 15. A glass mat 17, which may be impregnated, or alternately loose glass fiber may be used after suitable preheating, is also fed between the rollers 16 so that it is sandwiched between the two extruded thermoplastic sheets 12. The laminate is integrated by two sets of calendering rollers 18 and 19, cooled at 20 such as by chilled air and then fed by suitable rollers 21 to a sizing knife and block 22 and 23. The sized laminate may thereafter take an alternate direction 25 where it is stored and packaged at shipping 27 or where it may be delivered to a forming operation 26 where a stamping apparatus, which consists conventionally of a die 28 and stamp 29, in cooperation with an optional hold-down ring 30, forms the laminate 31 into a suitable shape as shown by the broken line 32. An appropriate mechanism such as spring 33 may be employed to eject the formed article from the die 28.

EXAMPLE 10

A procedure wherein a pair of glass mats are impregnated to form a thermoplastic sheet, as shown by reference to FIG. 2, where glass mats 40 and 41 fed from separate sources are joined through guide rollers 47 after at least one of the mats is immersed or otherwise impregnated with the thermoplastic resin. As shown in FIG. 2, only mat 41 is immersed in the resin bath 44 contained in a suitable container 45 by passing the mat around immersion rollers 46. Two sets of calendering rollers 48 and 49 integrate the laminate. Optionally, particularly where only one mat is impregnated in resin, it may be desirable to supply an additional relative minor quantity of resin on the surface as shown at 50. The spray may be positioned either before or at the calendering rollers as shown. The calendered laminate is then chilled at 52, compression rolled through a pair of rollers 54, and then sized by suitable means such as by knife and block 55 and 56, and guided over roller 57 to suitable stacking operation 58. Alternately, as shown in FIG. 1, the integrated sheet of FIG. 2 may be sent directly to a forming apparatus.

It will be apparent to those skilled in the art in view of the nature of the inventive disclosure that various modifications may be effected without departing from the scope of the invention. The several details disclosed as illustrative should not be construed as placing limitations on the inventive concept as required by the appended claims.

We claim:

1. A high-impact resin sheet having high interlaminar strength which is formable in shaping apparatus held at ambient temperature, comprising a glass mat having a glass fiber length of at least 1 inch, impregnated with polyethylene terephthalate having a molecular weight from about 5,000 to about 45,000.

2. A high impact sheet in accordance with claim 1 wherein the polyethylene terephthalate within the stated molecular weight is derived by degrading a resin having a molecular weight in excess of 45,000.

3. The sheet of claim 1 which incorporates up to 40 percent, by weight of the total sheet composition, of nylon.

* * * * *

PO-1050
(5/69)

UNITED STATES PATENT OFFICE
CERTIFICATE OF CORRECTION

Patent No. 3,765,998      Dated October 16, 1973

Inventor(s) H. J. Oswald, D. C. Prevorsek and P. J. Koch

It is certified that error appears in the above-identified patent and that said Letters Patent are hereby corrected as shown below:

Column 6, line 46 "$[72] = 2.29 \times 10^{-4} M_w 0.73$" should read --$[n] = 2.29 \times 10^4 M_w^{0.73}$--.

Column 8, Example 6 in the Table, third numeral from the bottom

"$1.4 \times 10^6$" should read --1.4--.

Signed and sealed this 23rd day of April 1974.

(SEAL)
Attest:

EDWARD M. FLETCHER, JR.
Attesting Officer

C. MARSHALL DANN
Commissioner of Patents